United States Patent [19]

Staudacher

[11] 4,267,990

[45] May 19, 1981

[54] METHOD FOR STEERING AN AIRCRAFT

[75] Inventor: Werner Staudacher, Zorneding, Fed. Rep. of Germany

[73] Assignee: Messerschmitt-Boelkow-Blohm Gesellschaft mit beschraenkter Haftung, Munich, Fed. Rep. of Germany

[21] Appl. No.: 959,076

[22] Filed: Nov. 9, 1978

[30] Foreign Application Priority Data

Nov. 17, 1977 [DE] Fed. Rep. of Germany ....... 2751361

[51] Int. Cl.³ .......................... B64C 15/00; B64C 3/50
[52] U.S. Cl. ..................................... 244/52; 244/199; 244/207; 244/214
[58] Field of Search ..................... 244/52, 90 R, 90 A, 244/90 B, 199, 204, 207, 210, 214, 45 A, 46

[56] References Cited

U.S. PATENT DOCUMENTS

| | | | |
|---|---|---|---|
| 1,290,136 | 1/1919 | Eaton | 244/210 |
| 2,503,585 | 4/1950 | Loedding | 244/214 |
| 3,090,584 | 5/1963 | Kuchemann et al. | 244/199 |
| 3,480,234 | 11/1969 | Cornish | 244/199 |
| 3,831,885 | 8/1974 | Kasper | 244/199 |
| 4,161,300 | 7/1979 | Schwaerzler et al. | 244/214 |

Primary Examiner—Charles E. Frankfort
Attorney, Agent, or Firm—W. G. Fasse; D. F. Gould

[57] ABSTRACT

The present aircraft steering method makes use of additional lift gained by controlling the separating of vortical flows from the leading edges of the wings for the purpose of controlling the aircraft about its pitch axis, its roll axis, and its yaw axis. The vortical flows are selectively or differentially separated from the leading edge of the wings by raising or lowering leading edge flaps and/or blowing a flowing medium over the wing surfaces substantially in parallel to the leading edge.

8 Claims, 13 Drawing Figures $C_{\mu_e} > C_{\mu_r}$ $\Delta C_y = \cos\varphi \cdot (C_{\mu_e} - C_{\mu_r})$ $C_{\mu_e} = C_{\mu_r}$
$\varphi_e < \varphi_r$ $\Delta C_y = C_\mu (\cos\varphi_e - \cos\varphi_r)$

METHOD FOR STEERING AN AIRCRAFT

BACKGROUND OF THE INVENTION

The invention relates to a method for steering an aircraft by controlling separated vortical flows at the leading edges of an airfoil by means of movable flaps or streams at the leading edge of the airfoil.

The air flow over slender, aerodynamic surfaces, for example, surfaces with delta, arrow or gull wing, or ogive, or gothic wing configuration, is dominated beyond a certain angle of attack by the occurrence of stable, concentric vortical sheets. The vortical sheets are being rolled up over the airfoil with a shape similar to a funnel. The vortical flow starts at the leading edge of the lifting surface, wing, or airfoil. The occurrence of such vortical flow depends on the sweep back and the nose structure of the lifting surface, that is, the curvature, and so forth as well as the smoothness of the contour or strake of the nose structure. The sweep back, the nose structure, and the strake influence the angle of attack or rather they determine the size of the angle of attack beyond which the flow characteristics have a nonlinear dependence on the geometric angle of attack, whereby an additional lift occurs, which is dependent on the angle of attack of the lifting surface or the wing.

German Pat. No. 699,157 illustrates examples of such wing forms, which produce a lift that may be varied by adjusting the position of wing components in response to the air pressures occurring at the upper side and at the lower side of the wing nose. The pressure difference existing in this instance, between the upper side and the lower side is caused by the positive pressure at the lower side and the negative pressure at the upper side of the wing, whereby the angle of attack of the entire wing is increased.

The most varying methods for utilizing or gaining an additional lift have been proposed heretofore. For example, the German Patent Publication (DOS) No. 1,506,598 suggests constructing the leading edges of the wings as a special gap-camber flap. The German Patent Publication (DOS) No. 1,917,532 develops this idea further by constructing two extendible flap members so as to form a gap. All of the above proposed solutions for obtaining additional lift have the disadvantage, that the total nonlinear additional lift may not be utilized completely because the steering capability and the stability about the roll and yaw axes are very quickly and prematurely lost at the angle of attack required for such full utilization of the supplementary lift.

OBJECTS OF THE INVENTION

In view of the above it is the aim of the invention to achieve the following objects singly or in combination:

to provide a method for steering an aircraft by making the effective angle of attack of the aircraft wings substantially independent of the above condition of the geometric angle of attack;

to provide the leading edges of the wings with movable flaps for separating the vortical flows to gain additional lift;

to provide blowing means for directing an outward stream from the port and the starboard sides of the fuselage to blow off the vortical air flow from the lifting surfaces of the aircraft wings;

to use the additional lift for steering, stabilizing, and trimming the aircraft within a wider range of the angle of attack; and to make the nonlinear lift independent of the angle of attack of the respective wing.

SUMMARY OF THE INVENTION

The aircraft steering method of the present invention controls leading edge wing flaps and/or blowing means differentially or selectively. The angular displacement or position of the leading edge flaps of the wings is selectively controlled downwardly and upwardly relative to the horizontal and/or a concentrated blowing is selectively controlled to cause a stream to flow over the wing surfaces substantially parallel to the leading edge of the wings. This differential or selective angular displacement and/or blowing produces a steering moment in the rolling and pitching directions and a banking or lateral force. The anguler displacement of the leading edge flaps of the wings and the blowing over the lift surfaces substantially parallel to the leading wing edge may be carried out symmetrically or unsymetrically.

These features of the invention provide a method making it now possible to decouple the nonlinear lift from the geometric angle of attack of the wings. In addition, an effective roll control in a range of higher angles of attack is accomplished along with a direct lateral force control by the differential or selective activating of the leading edge flaps and/or by the blowing over the wing span.

BRIEF FIGURE DESCRIPTION

In order that the invention may be clearly understood, it will now be described, by way of example, with reference to the accompanying drawings, wherein.

Figure 1A:
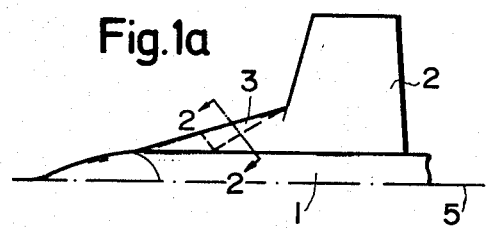
FIGS. 1a to 1f illustrate various lift surface or wing forms with a leading edge cambered flap arranged thereon wherein the flaps of FIGS. 1a, 1d and 1f are straight, whereas the flaps of FIGS. 1b, 1c and 1e have a curved leading edge, only one half is shown of the respective aircraft to save space.
Figure 1D:
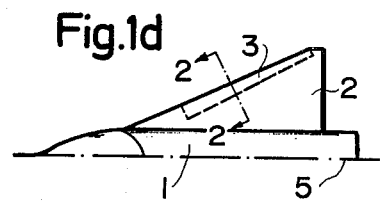
Figure 1B:
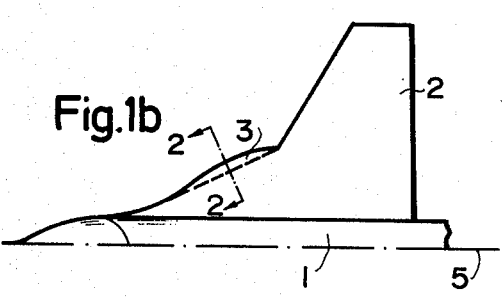
Figure 1E:
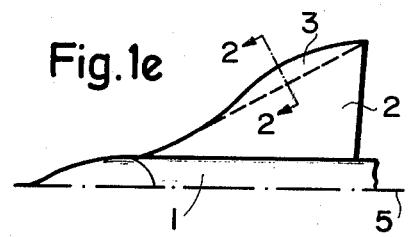
Figure 1C:
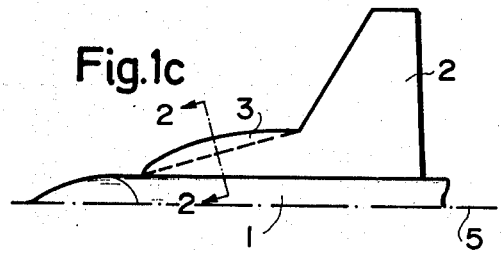
Figure 1F:
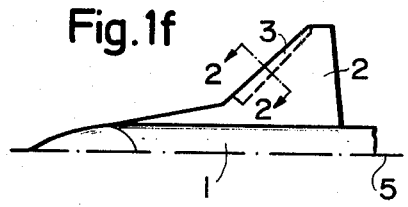

DETAILED DESCRIPTION OF PREFERRED EXAMPLE EMBODIMENTS ILLUSTRATING THE BEST MODES OF THE PRESENT INVENTION

The method of the present invention relates to modifying of the leading edges of arcraft wings or to modifications in the vicinity of the leading edge of the wings. The wings may have any desired shape. Accordingly, the present method may be applied in connection with any cross sectional contour of the wing, whether it be round or pointed and regardless of whether the outline trace of the wing contour is bowed, straight, or whether the wing outline has one or more gull wing type breaks therein. It also makes no difference whether the front edge camber flap is formed as a portion of the leading edge of the wing or whether it forms the entire leading edge of a wing. FIGS. 1a to 1f illustrate top plan views of various wing shapes. Each configuration, regardless of its shape, has a fuselage 1 and wings 2 attached to the fuselage 1. Only one half of the aircraft is shown but each configuration is symmetric about the center line 5. A camber flap 3 is movably and controllably attached to the leading edge of the wing 2 by a hinge 4.

Figure 2:
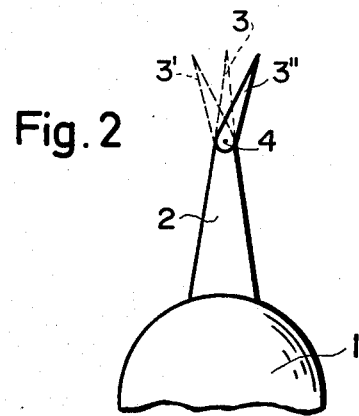
FIG. 2 is a sectional view through the wing and camber flap along section line 2—2 in FIGS. 1a to 1f.

FIG. 2 shows the camber flap 3 of FIGS. 1a to 1f in various positions relative to the horizontal plane. FIG. 2 is a simplified sectional view along the section lines 2—2 in FIG. 1a to 1f. 3' is the camber flap swung upward with respect to said horizontal, and 3" is the downward position of the flaps 3.

For performing the present method of the invention the aircraft wings 2 have integrated camber flaps 3 including movable members which may be swung out not only upwards, but also downwards as shown in FIG. 2. These features make it possible to decouple or separate the effective angle of attack from the geometric angle of attack. This decoupling and hence the independent production of a nonlinear additional lift may be accomplished in three ways. First, by means of upwardly tilted nose flaps, for example, so-called Krueger flaps or camber flaps are suitable for this purpose. Secondly, the separation or decoupling is possible by means of concentrated blowing over the upper side of each wing substantially parallel to the leading edges or parallel to the hinge molding of the flap hinges 4. Third, the separation may be achieved by means of combining both of the previously mentioned methods, whereby a blowing over the wing span is used in addition for the stabilizing of the vortical system produced by the first method; that is, by the tilting of the nose flaps. Consequently both the stability and the steering of an aircraft configuration are actively influenced in a symmetric and/or nonsymmetric manner.

Figure 3:
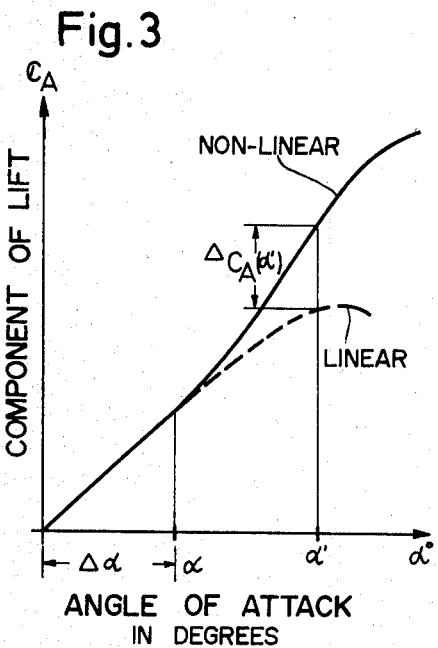
FIG. 3 illustrates a diagram of the nonlinear lift $C_A$ produced as a function of the angle of attack $\alpha$.

FIG. 3 illustrates the relation of the lift component $C_A$ as a function of the angle of attack $\alpha$ of the aircraft wings. $\Delta\alpha$ indicates the range in which the lift component $C_A$ $(\alpha<\alpha_o)$ is linear. For angles of attack $\alpha>\alpha_o$, the lift components $C_A$ is nonlinear. $\Delta C_A(\alpha')$ is the additional lift component at an angle $\alpha'$ within the nonlinear range $\alpha_o<\alpha'<\alpha_{s+all}$ which is effectively used for steering the aircraft according to the invention.

Figure 4:
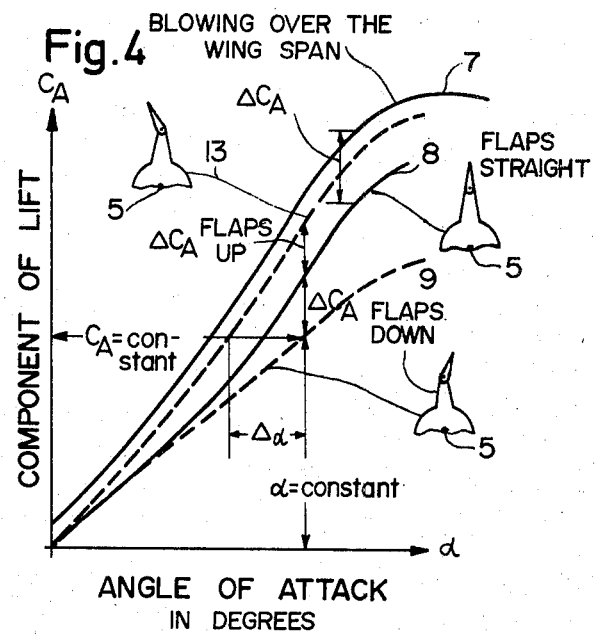
FIG. 4 illustrates a diagram similar to that of FIG. 3 wherein the lift control is accomplished by the nonlinear camber flap control as well as by a blowing along the wing span.

FIG. 4 illustrates the various lift components $C_A(\alpha)$ with different positions of the flap 1 relative to the horizontal which is considered to extend in the axis 5 of the aircraft 1 which flies, into the plane of FIG. 4, whereby the horizontal extends perpendicularly to the plane of the drawing.

The activation of the flaps or the blowing over the wing span occurs symmetrically relative to the axis 5 of the fuselage 1. That is, the port side and the starboard side receive a blowing impulse of equal magnitude and direction.

The dashed curve 13 shows the increased lift component $C_A$ when the leading edge flap is swung upwardly with respect to the horizontal as defined. The dashed line curve 9 shows the reduced lift component $C_A$ when the leading edge flap is down. Curve 7 shows the lift component $C_A$ resulting from additional blowing over the wing span. Curve 8 shows the lift component $C_A$ when the flap 3 is in the normal or horizontal position. The lift control component $\Delta C_A$ is the difference between the lift component with normal flap position (curve 8) at $\alpha$=constant and the lift component with upwardly or downwardly swung flaps at the same angle $\alpha$=constant. The lift control component $\Delta C_A$ caused by blowing over the wing surface is given as the difference between the corresponding values of $C_A$ at $\alpha$=constant of curves 7 and 8.

Figure 5:
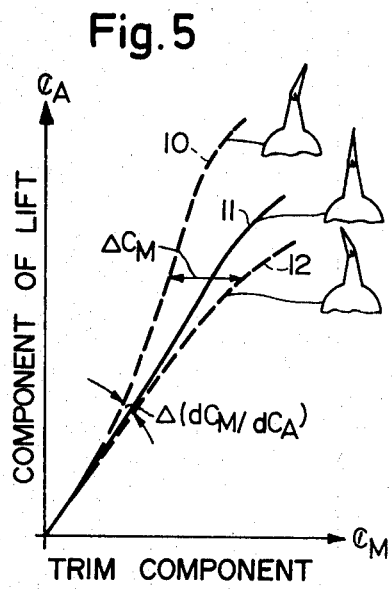
FIG. 5 is a diagram illustrating the various lift conditions for the pitch control and stabilization as a function of the trim component given by different flap positions.

FIG. 5 shows the lift component $C_A$ as a function of the pitch control, or trim compensation $C_m$. The pitch stability is given by the slope $\Delta C_M/\Delta C_A$. Curves 10, 11, 12, show the function for the flap corresponding positions as illustrated in FIGS. 5 and 4.

Figure 6:
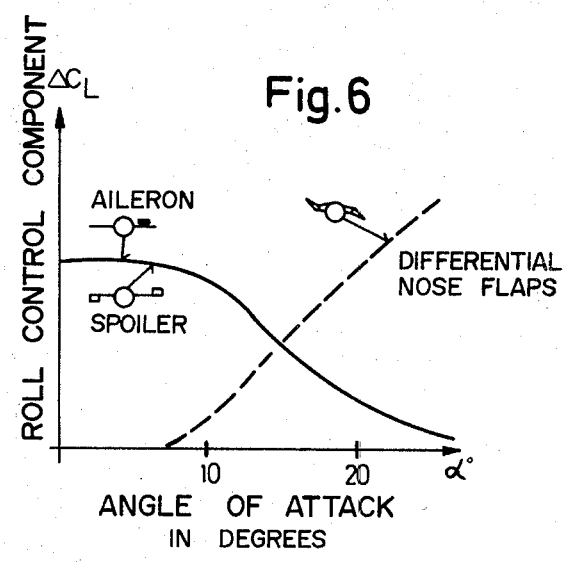
FIG. 6 is a diagram of the relation of the roll steering as a function of the angle of attack with unsymmetrical activation of the flaps.

The solid curve of FIG. 6 shows the roll control reducing effect of ailerons or spoilers with an increasing angle of attack. The dashed curve indicates that the roll component $C_L$ may be substantially increased for the roll control $\Delta C_L$ by means of differentially controlled nose flaps. The flaps are activated unsymmetrically in this instance as illustrated with the right flap down and the left flap up.

Figure 7:
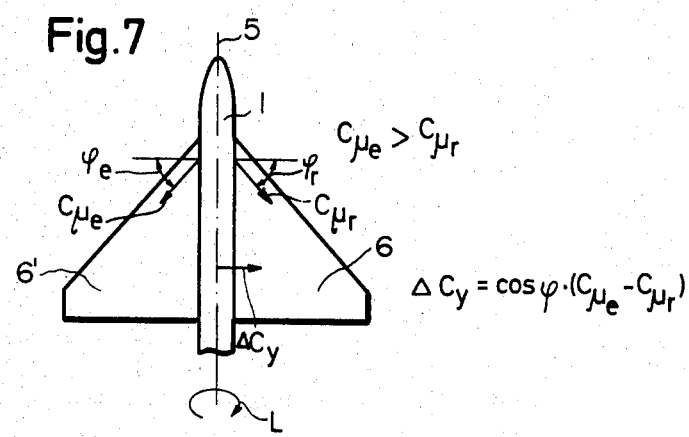
FIG. 7 is a top view of an aircraft configuration with unsymmetrical blowing impulses, for example, the impulse on the left side is larger than the impulse on the right side.
Figure 8:
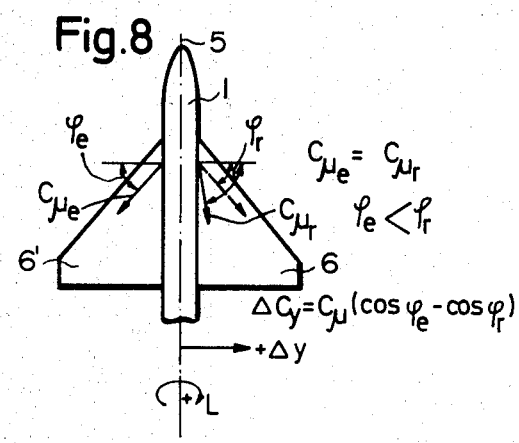
FIG. 8 is a top view of an aircraft configuration with unsymmetrical blow direction, whereby the magnitude of both impulses, however, is the same or symmetrical on both sides.

FIGS. 7 and 8 show the effect of blowing on one or both sides with varying blowing impulse magnitude or with varying blowing directions, on the roll control $\Delta C_L$ or lateral force control $\Delta C_Y$. The lateral forces produced in the instances of FIGS. 7 and 8 are directed substantially toward the center of the curve which the aircraft flies whereby only lateral forces are produced for the intended curve. In other words, the control component is in the direction $+\Delta y$ and the plane will fly to the right. In FIG. 7 the blow impulse $C\mu r$ at the starboard side is smaller than the blow impulse $C\mu e$ at the port side, $C\mu e>C\mu r$. In FIG. 8 the angle $\phi e$ of the blow direction at the port side is smaller than the angle $\phi r$ of the blow direction at the starboard side $\phi e<\phi r$. FIG. 7 illustrates the effect of unsymmetric blowing across the wing surfaces substantially parallel to the leading edges of the wings 6. A lateral force control component $\Delta Cy$ results from the relation:

$$\Delta Cy = \cos\phi \cdot (C\mu e - C\mu r),$$

where $\phi$ is the angle of the blow direction relative to the pitch axis or y-direction, $C\mu e$ is the magnitude of the blowing impulse along the port side wing surface 6', $C\mu r$ is the magnitude of the blowing impulse along the starboard wing surface 6.

FIG. 8 illustrates the effect of unsymmetrical blowing over the wing surfaces with the same blow impulse magnitude $C\mu$ over both wings, however, with unsymmetrical blow angles $\phi$ with respect to the pitch axis. The lateral force control component $\Delta Cy$ is in this instance:

$$Cy = C\mu \cdot (\cos\phi_e - \cos\phi_r)$$

whereby $\phi_e < \phi_r$.

The lateral force control $\Delta Cy$ and the roll control $\Delta C_L$ may be accomplished in a variety of methods with unsymmetrical activations. In one instance, by means of differential or selective tilting of the front edge flap alone, then by means of differential or one sided blowing with varying blow impulse magnitudes and/or varying blow directions, and further, by means of a combination of flap tilting and blowing.

There are, however, still further combination possibilities, for instance, symmetrical blowing together with differential or selective extension or tilting of the leading edge flap or symmetrical extension or tilting of the leading edge flap with differential or one sided blowing. Particularly in connection with the roll control, the method of the invention is especially efficient (dashed curve in FIG. 6), because until now the effectiveness of the often enormously expensive roll rudders (ailerons, spoilers, etc.) was very quickly lost as the angle of attack increased, as shown by the full line curve in FIG. 6.

Although the invention has been described with reference to specific example embodiments, it is to be understood that it is intended to cover all modifications and equivalents within the scope of the appended claims.

What is claimed is:

1. A method for steering an aircraft having a fuselage and two wings, by controlling the separation of vortical air flow at the leading edge of said wings by blowing means, comprising the steps of providing position variable blowing means in the aircraft fuselage adjacent to the leading edge of both wings whereby the angle of the blowing direction may be varied relative to a line extending perpendicularly to the roll axis of the aircraft fuselage, blowing a flowing medium laterally outwardly from said blowing means over said aircraft wings substantially in parallel to said leading edge of said aircraft wings, and differentially controlling the angular position of said blowing means whereby said aircraft may be controlled with respect to its roll axis, its pitch axis, and its yaw axis.

2. The method of claim 1, wherein said differential controlling of the angular position of said blowing means occurs substantially symmetrically relative to said roll axis and in combination with differentially controlling the magnitude of the blowing impulse.

3. The method of claim 1, wherein said differential controlling of the angular position of said blowing means occurs substantially non-symmetrically relative to said roll axis and in combination with differentially controlling the magnitude of the blowing impulse.

4. A method for steering an aircraft having a fuselage and two wings, by controlling the separation of vortical air flow from the leading edge of said wings, comprising the steps of securing leading edge flap means with a rear edge thereof to a respective hinging axis along the leading edge of each of said wings for a differentiable up and down movement of said leading edge flap means relative to a horizontal plane extending through said hinging axis, providing position variable blowing means in the aircraft fuselage adjacent to the leading edge of both wings whereby the angle of the blowing direction may be varied relative to a line extending perpendicularly to the roll axis of the aircraft fuselage when blowing a flowing medium laterally outwardly from said fuselage across the surfaces of each of said wings, activating said leading edge flap means up or down relative to the horizontal, activating said blowing means to blow said flowing medium over said aircraft wings substantially in parallel to the leading edge of said wings and differentially controlling both said activating operations for steering the aircraft relative to its roll axis, its pitch axis, and its yaw axis.

5. The method of claim 4, wherein said controlling of said leading edge flap means is performed substantially symmetrically relative to the respective wing and wherein said controlling of said blowing is also performed substantially symmetrically relative to the respective wing.

6. The method of claim 4, wherein said controlling of said leading edge flap means is performed substantially symmetrically relative to said leading edge and wherein said controlling of said blowing is performed substantially unsymmetrically relative to the respective wing.

7. The method of claim 4, wherein said controlling of said leading edge flap means is performed substantially unsymmetrically relative to said leading edge, and wherein said controlling of said blowing is performed substantially symmetrically relative to the respective wing.

8. The method of claim 4, wherein said controlling of said leading edge flap means is performed substantially unsymmetrically relative to said leading edge, and wherein said controlling of said blowing is performed substantially unsymmetrically relative to the respective wing.

* * * * *